US006934735B1

(12) United States Patent
Emens et al.

(10) Patent No.: US 6,934,735 B1
(45) Date of Patent: Aug. 23, 2005

(54) SOFTWARE AND METHOD FOR CONTROLLING THE TIMING OF DELAYED DOWNLOADS

(75) Inventors: Michael L. Emens, San Jose, CA (US); Reiner Kraft, Gilroy, CA (US); Gaurav Tewari, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 09/611,839

(22) Filed: Jul. 7, 2000

(51) Int. Cl.[7] .............................................. G06F 15/16
(52) U.S. Cl. .................................... 709/203; 709/224
(58) Field of Search ................................ 709/203, 224

(56) References Cited

U.S. PATENT DOCUMENTS

| 5,790,935 | A | | 8/1998 | Payton | |
|---|---|---|---|---|---|
| 5,920,701 | A | * | 7/1999 | Miller et al. | 709/228 |
| 6,055,564 | A | * | 4/2000 | Phaal | 709/207 |
| 6,134,584 | A | * | 10/2000 | Chang et al. | 709/219 |
| 2004/0010546 | A1 | * | 1/2004 | Klug et al. | 709/203 |

FOREIGN PATENT DOCUMENTS

| EP | 0926584 A1 | 6/1999 |
|---|---|---|
| WO | WO 97/45786 | 12/1997 |

OTHER PUBLICATIONS

IBM Research Disclosure, General Framework for Managing Bandwidth Usage for Heterogeneous Units of Work for a Mobile Client, Oct. 1998/ 1389, 41478.

* cited by examiner

*Primary Examiner*—Ario Etienne
*Assistant Examiner*—Barbara Burgess
(74) *Attorney, Agent, or Firm*—Jon A. Gibbons; Fleit, Kain, Gibbons, Gutman, Bongini & Bianco P.L.

(57) ABSTRACT

A system for accepting a specification of a time interval during which a download is to be performed on a delayed basis is described. The system can also select a time within the specified period. The selection can be randomized with the aim of distributing the load placed on computer and communication resources, or the selection may be based on testing a number of measures of computer and communication resource availability, and selecting a time of low utilization. A fuzzy measure of resource availability can be obtained, e.g., as a weighted sum of multiple measures, or each measure can be tested against a limit separately. According to another aspect of the invention a system and computer readable medium is disclosed for carrying out the above method.

19 Claims, 7 Drawing Sheets

SOFTWARE AND METHOD FOR CONTROLLING THE TIMING OF DELAYED DOWNLOADS

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

FIELD OF THE INVENTION

This invention pertains to a download scheduling in a computer network, e.g., the Internet. More particularly the invention relates to a method, system, and software for scheduling of downloads in order to avoid overloading server and/or client computer resources.

BACKGROUND OF THE INVENTION

Powerful multimedia capable computers which are able to store and process large multimedia files, and other large files continue to proliferate. Combined with the continued development of the Internet infrastructure, there has been a trend toward transporting a greater number and larger files over the Internet. This trend has been fostered by the deployment of higher bandwidth data links in the Internet infrastructure including fiber optic cable, and DSL lines.

Nonetheless certain bottle necks in the communication infrastructure remain. For example typically intranets on Local Area Networks (LANS) are connected to the Internet through a firewall/proxy server computer, which serves to screen and/or block traffic between the intranet and the Internet for security purposes. Such firewall/proxy server computers become bottlenecks for traffic between the intranet and the Internet.

It is often the case that a home or small business user is connected to the Internet through a dial-up modem connecting to a dial-up server of an Internet Service Provider (ISP). The dial-up connection is relatively slow compared to links between the dial-up server and other Internet hosts or routers.

Regardless of the capacity of the data pathway available to a client computer, the data pathway may be overloaded if one or more clients initiate a large number of downloads and/or large downloads.

Server overloading will also cause a delay in executing downloads. If a server download request queue is full, the time required to complete a download will be extended. High demand for downloads during peak, e.g., business, hours will decrease server response time.

Additionally, if the client computers resources, as measured for example, by the processor utilization percentage, are heavily loaded, the download will take longer. Increased download time is due to the unavailability of the processor for servicing the communication process.

Certain downloaded files are desired for immediate use. For others delayed delivery is perfectly acceptable to the user. In fact, times, such as, non work hours, when the client processor utilization, the server load, and communication system load are low are preferred for executing bandwidth intensive downloads.

What is needed is a system to overcome the problems of long download times and which automatically selects an optimum time to perform downloading.

What is further needed is a system by which a user may specify a window of time including an ending time by which a download needs to be performed. A system which selects an optimum time within the specified window for performing the download according to availability of client, server, and communication resources is also needed.

SUMMARY OF THE INVENTION

Briefly, according to the invention a method for scheduling a download from a server computer to a client computer is provided, the method comprises steps of obtaining a first threshold time value, obtaining a second threshold time value, and determining a time for performing a download between the first threshold time value and the second threshold time value.

In an alternate embodiment, a system and computer readable medium is disclosed to carry out the above method.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

Exemplary Network

Figure 1:
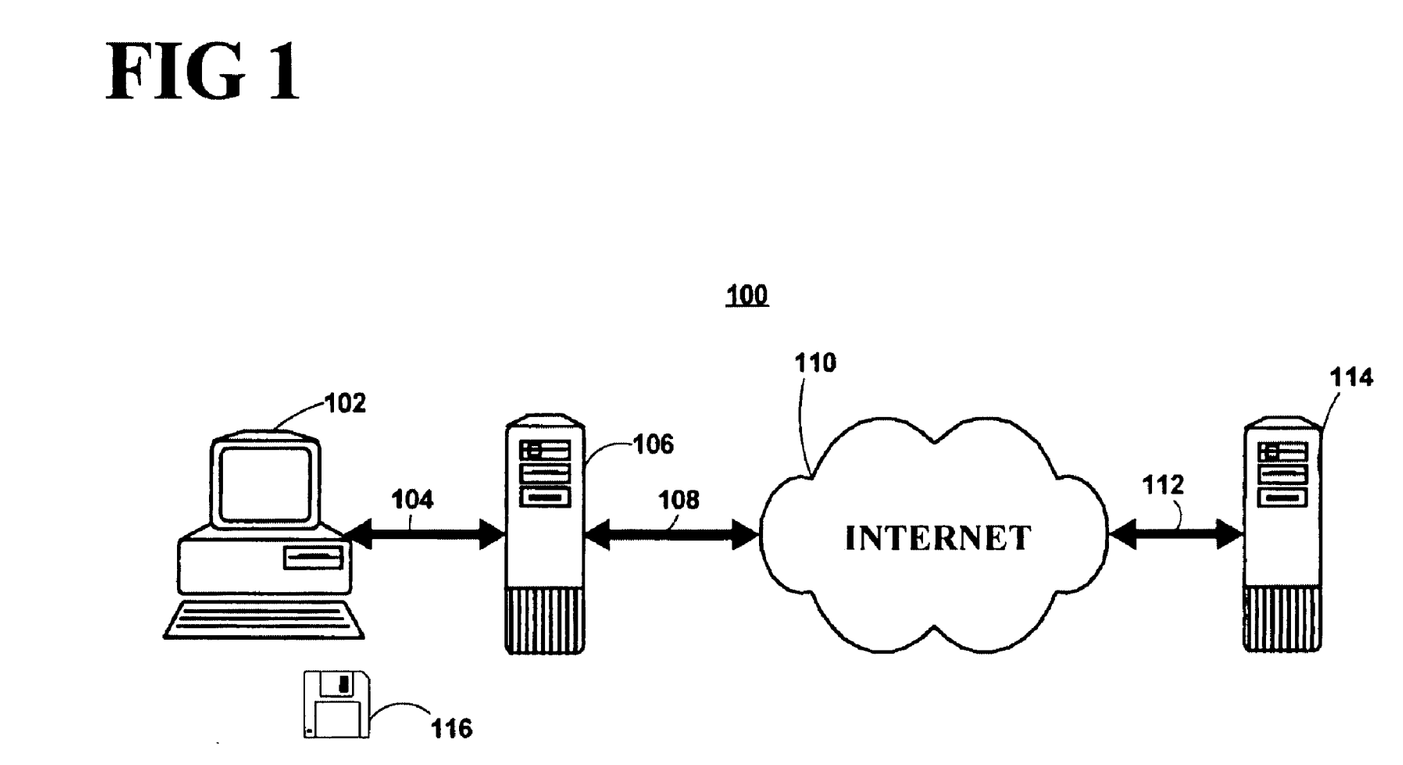
FIG. 1 is a schematic of a computer system used in practicing an embodiment of the invention.

Referring to FIG. 1 a schematic of a computer system 100 used in connection with an embodiment of the present invention is depicted. A client computer 102 is connected by a first bidirectional data link 104, e.g., ethernet LAN, to a proxy server 106. An ethernet card (not shown) provides a network interface to the client computer. The proxy server 106 is connected through a bidirectional data link 108. A Digital Subscriber Line (DSL) to the Internet 110 provides a second bidirectional data link. A file server 114, is connected to the Internet 110 through a third bidirectional data link 112, e.g., a T1 line.

A memory medium 116 is provided for loading download scheduling intelligent agent software, the functioning of which will be described below with reference to the FIGS. onto client computer 102.

Figure 2:
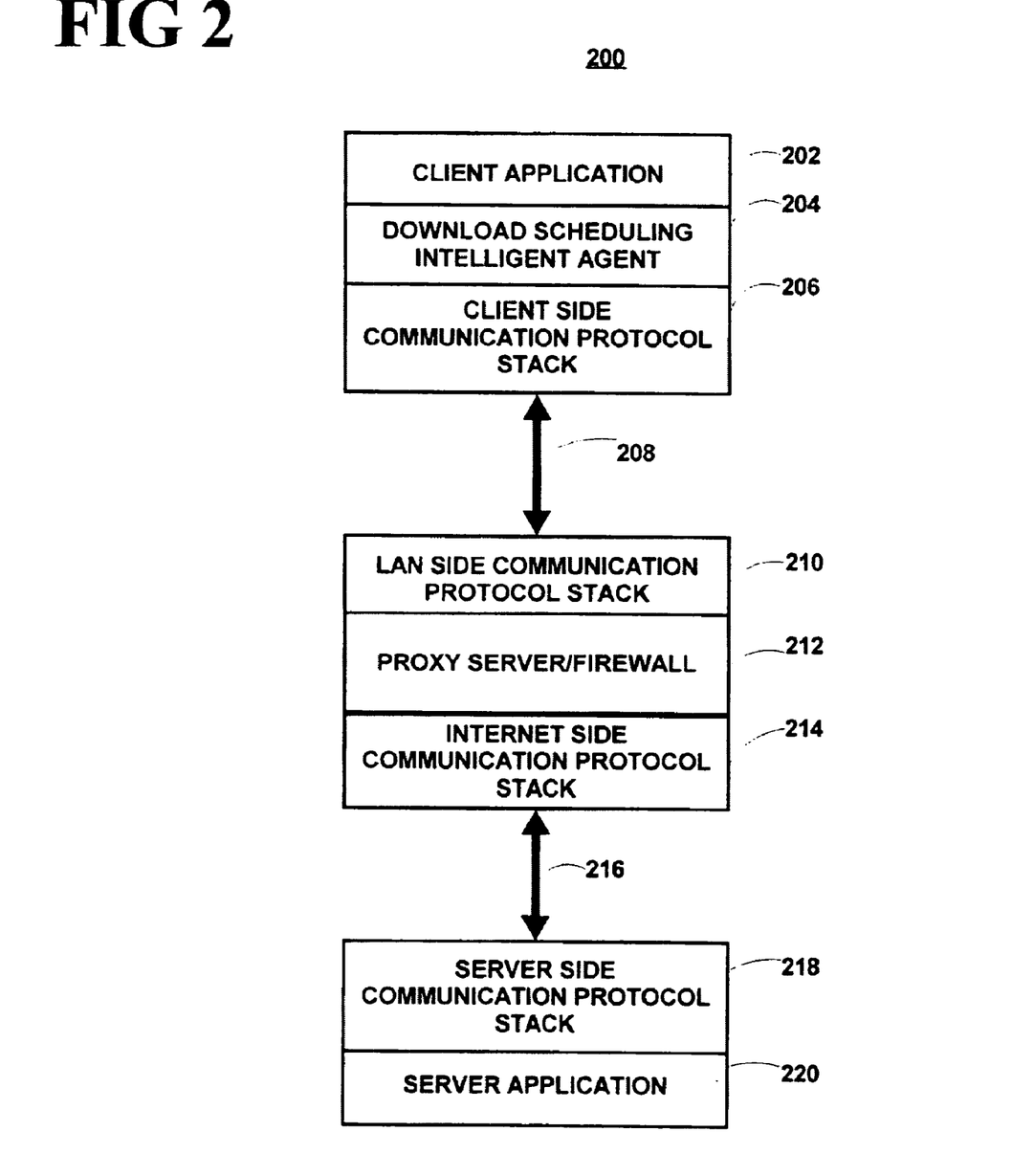
FIG. 2 is a representation of software interrelationship according to an embodiment of the present invention.

Exemplary Functional Block Diagram of Various Software Components According to an Embodiment of the Invention Referring to FIG. 2 a schematic 200 representing the interrelationship of software components according to an embodiment of the invention is shown. A client application 202 such as a web browser, e.g., Netscape Navigator functions in cooperation with a down load scheduling intelligent agent 204, which may be implemented as a browser plug-in. The plug-in and the web browser interoperate with each other by calling various methods in each others Application Programming Interfaces (API) to perform various functions. The processes performed by the download scheduling intelligent agent according to the invention will be described below with reference to the flow diagrams shown in the FIGS. A client side communication protocol stack 206 is provided.

The inter-operating client application 202 and download scheduling intelligent agent 204, are connected by connection 208 established by the client side communication protocol stack 206 and a LAN side communication protocol stack 210 associated with a proxy server/firewall program 212. An Internet side communication protocol stack 214 is also associated with the proxy server firewall program 212, and works in conjunction with a server side communication protocol stack 218 to establish a connection 216 between the proxy server/firewall program 212 and a server application 220.

Communication protocol stacks 206, 210, 214 and 218 may, for example, comprise Hypertext Transfer Protocol (HTTP) over Transfer Control Protocol/Internet Protocol (TCP/IP)

Connections 208 and 216 may be defined by unique network addresses and port numbers.

Figure 3:
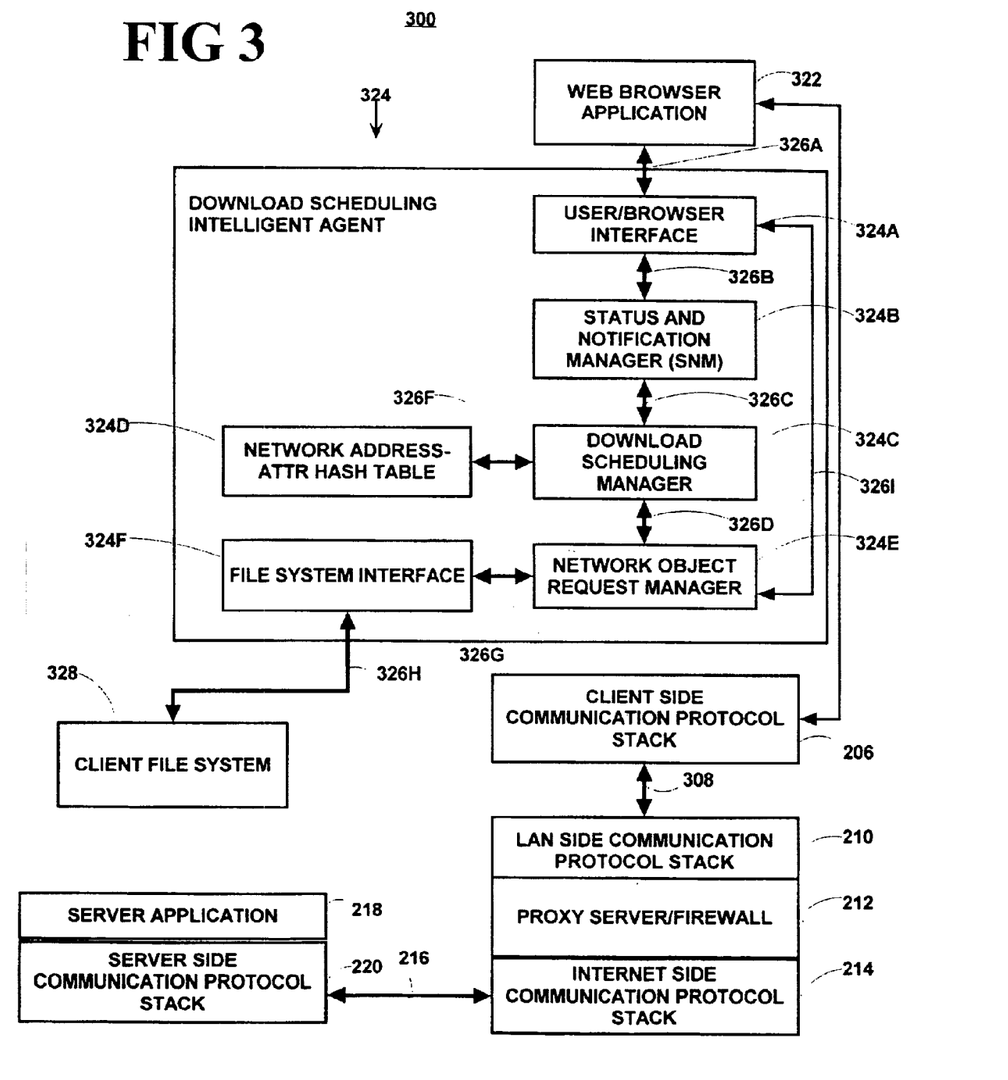
FIG. 3 is a more detailed representation of software interrelationship of FIG. 2.

More Detailed Functional Block Diagram of Various Software Components of FIG. 2

Referring to FIG. 3 a more detailed schematic 300 representing the interrelationship of software components of FIG. 2 is shown. FIG. 3 shows internal details of a download scheduling intelligent agent 324.

Referring to FIG. 3, a client application, in this case, particularly a web browser 322 inter-operates with download scheduling intelligent agent 324. The download scheduling intelligent agent may for example take the form of a web browser plug-in.

It is noted that FIG. 3 depicts an organization of the software components of the scheduling agent that is merely exemplary. This organization is also suitable for presentation of the various functions. However, the organization used will depend largely on the software design philosophy of the implementer, which is somewhat influenced by the programming language chosen for implementation and the prevailing programming philosophy.

The download scheduling intelligent agent comprises a user/browser interface 324. The user/browser interface comprises various API methods involved in inter-operating of the web browser 322 and the download scheduling intelligent agent, including methods for setting up plug-in specific user interface screens, transferring data, and requesting the browser to retrieve a resource designated by a Uniform Resource Identifier (URI). Specifically the functions of the user/browser interface include setting up graphical user interface devices for accepting user inputs as to the time during which a download is to be performed, and the weight to be given to various measures of computer and communication resource availability in deciding when to perform a given download, and/or limits on computing and/or communication resource usage compatible with a decision to perform a download, as will be discussed below with reference to flow diagrams shown in the FIGS.

The user/browser interface 324A inter-operates with a status and notification manager (SNM) 324B The SNM 324B receives download requests including the aforementioned timing and weight and/or limit information through the user/browser interface module, and maintains a record in a memory accessible to it, e.g., a memory associated with client computer 102, of the status of download requests. The SNM may also be capable of generating an output, e.g., a screen window, which relates the current status of various downloads requested by the user.

A download scheduling manager (DSM) 324C receives download requests along with the aforementioned timing and weight information from the SNM stores information in a hash table. The download scheduling manager performs the function of determining when to perform the download.

A network object request manager (NORM) 324E receives request to download files from the DSM 324C, and downloads the requested file. The NORM may utilize the web browser application's 322plug-in API to request the web browser application 322 to perform the download. The NORM 324F interoperates with a file system interface 324F through which a file system 328 associated with the client computer 102 may be accessed, e.g., for the purpose of storing a downloaded file.

Double ended arrows 326A, 326B, 326C, 326D, 326E, 326F, 326G, 326H, and 326I represent the software interrelationships, e.g., the methods used to communicate between the various components.

Exemplary a Method for Processing a Request for a Delayed Download

Figure 4:
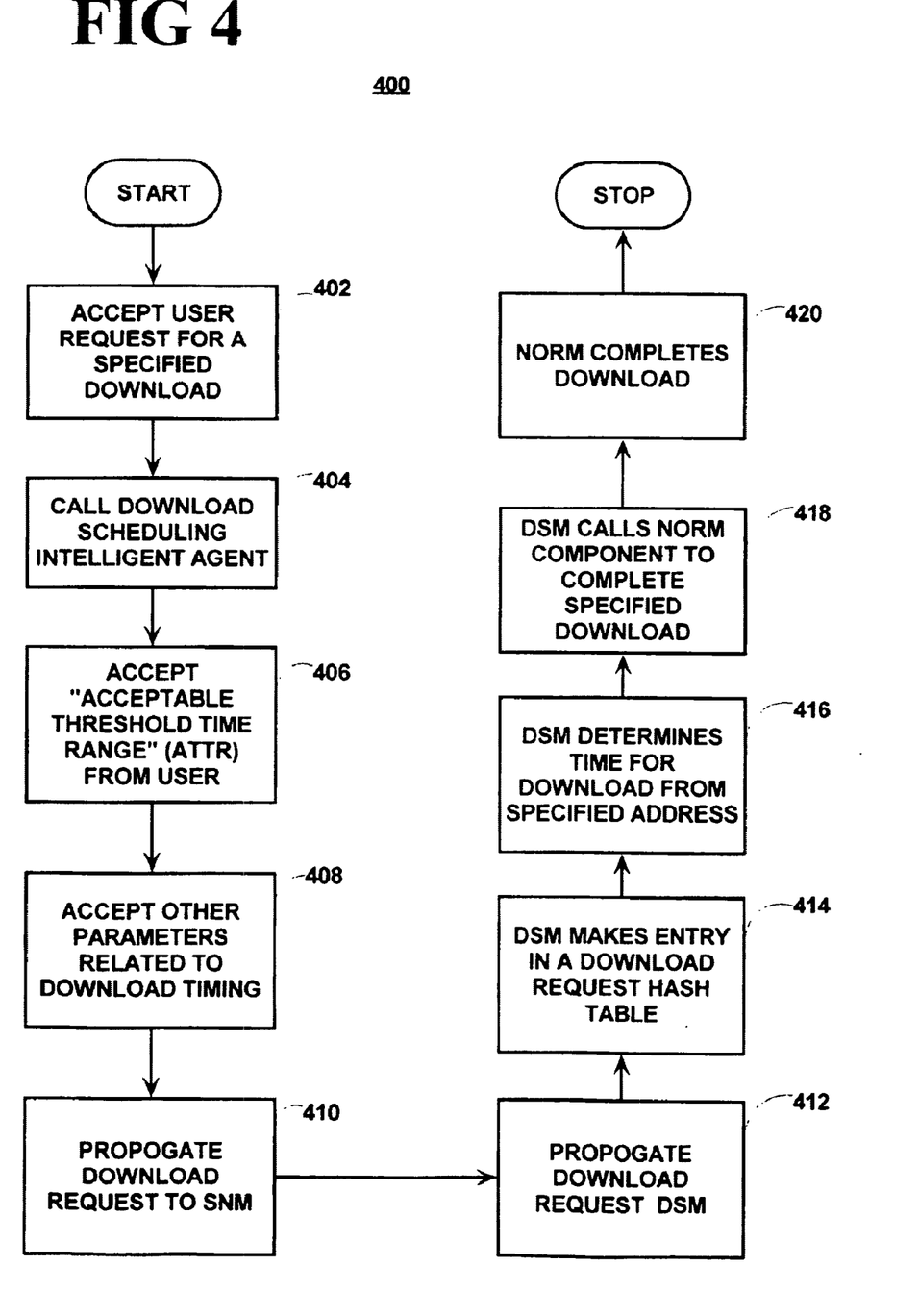
FIG. 4 is a flow diagram of a method for processing a request for a delayed download according to an embodiment of the present invention.

Referring to FIG. 4, a flow diagram 400 of a method for processing a request for a delayed download is shown. In process block 402 a request for a specific download (e.g., specific URI) is accepted from a user. For example the user may request a specific download by clicking a Hyper Text Markup Language (HTML) hyperlink on a web page containing HTML <EMBED> which specifies a web browser plug-in which embodies the download scheduling intelligent agent, e.g., that shown in FIG. 3.

In process block 404, in response to the user request for download, the download scheduling intelligent agent is instantiated. Upon starting the download scheduling agent may display a graphical user interface (GUI) dialogue box through which the user can enter information relative to the time interval in which the download is to be performed, and possibly also relative to the weights to be given to various measures of computing and communication resources in determining the download time, and/or limits on current levels of resource utilization at the time the download will be initiated. Use of the specified interval, weights, and limits will be described more fully below. The GUI may be displayed within the browser window or externally.

In process block 406 an indication of the time interval during which the user desires the download to be performed termed "Acceptable Threshold Time Range" (ATTR) is accepted from the user. The ATTR comprises a Beginning Threshold Time Value (BTTV) and an Ending Threshold Time Value (ETTV). In process block 408 other parameters that are used in determining the timing of the download, e.g., the previously mentioned weights and/or limits are accepted, e.g., through the GUI dialogue box.

In process block 410 a download request which includes identification of the requested item, e.g., by URI, the ATTR, and the parameters accepted in process block 408 is propagated to the SNM. The SNM may then present a new GUI window, e.g., dialog box or update the display in an existing GUI window to reflect acceptance of the download request.

In process block 412 the download request is forwarded to the DSM. In process block 414, the DSM makes an entry in a download request hash table which it maintains. The download request hash table may include an identification of the requested download, e.g:, by URI, the ATTR, and the aforementioned weights and/or limits. The ATTR and the weights and/or limits are used by the DSM in determining the time at which the download is performed, as will be discussed in more detail below with reference to FIGS. 6 and 7. The ATTR and the weights and/or limits may be obtained through a GUI dialog box generated by the SNM and optionally stored temporarily in a memory associated with client computer 102.

In process block 416 the DSM determines the time for performing the download from the specified address. In process block 418, the DSM calls the NORM component at the time calculated in process block 416 to perform the download. In process block 420, the NORM component completes the download. The NORM component may store the downloaded file in a default file location or a file location previously specified by the user. In doing so the NORM component may utilize the file system interface 324F to access the client computer 102 file system 328. The GUI dialogue box which may be presented to user upon receiving the users file request, may also be used to accept a specification from the user of the file system location (e.g., directory) to which the downloaded file should be stored.

Figure 5:
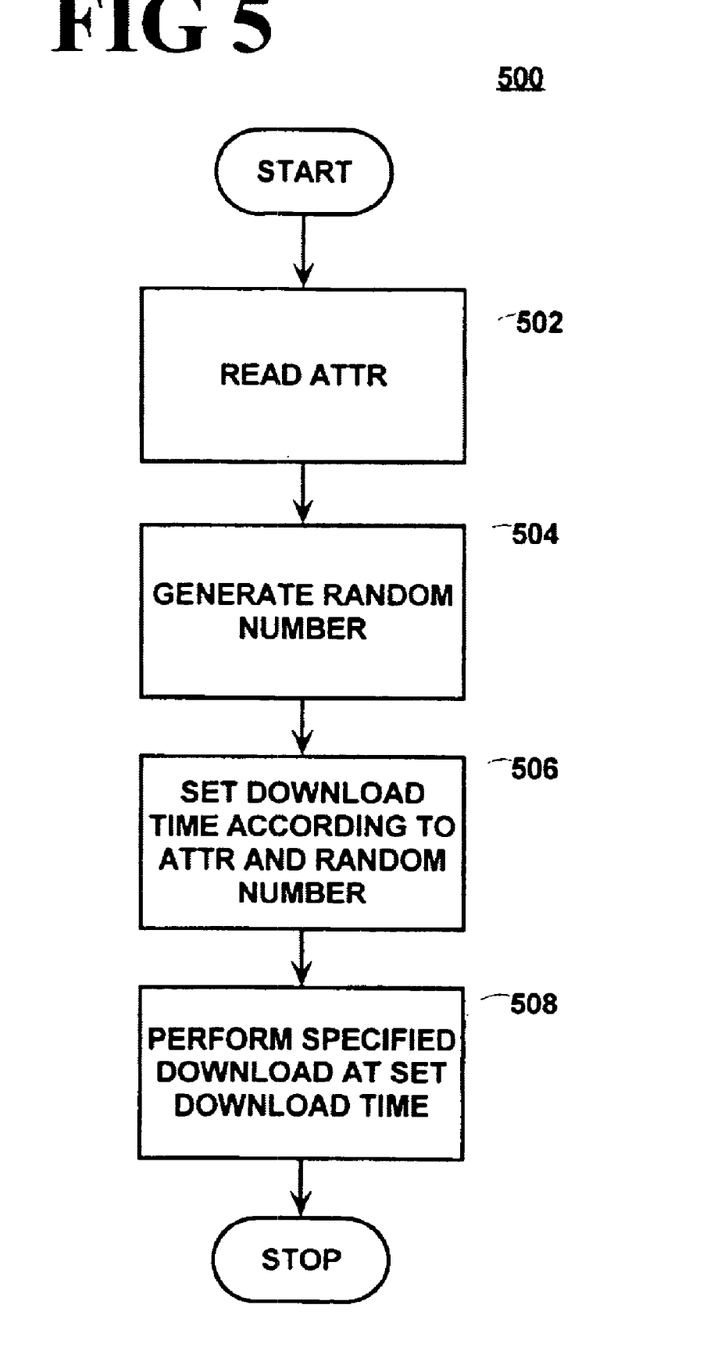
FIG. 5 is a flow diagram of a method for determining the time for downloading a file within a specified interval according to an embodiment of the present invention.

Exemplary Method for Determining the Time for Downloading a File Within a Specified Interval Referring to FIG. 5, a flow diagram 500 of a method for determining a download time within a specified time interval is shown. In process block 502 a ATTR comprising a BTTV, and ETTV which the user has previously entered are read. Alternatively, the ATTR values may be preselected values stored in a software configuration file. The stored values could for example correspond to non-business hours, during which computer and communication resource utilization are expected to be at a minimum.

In process block 504 a random number is generated. The random number may for example be a finite precision number between zero and one. The random number may be generated by a pseudo-random number generator algorithm which may be provided as a built in function or library function depending on the programming language used.

In process block 506 the download time is set in accordance with the ATTR and the random number generated in process block 504, i.e., it is set to a random time within the time interval specified by the ATTR. The download time could for example be set according to the following formula:

$$DT=BTTV+(ETTV-BTTV)*RAND,$$

where BTTV is a time value corresponding to the beginning of the time interval during which the download is to be performed, ETTV is a time value corresponding to the end of the time interval during which the download is to be performed, RAND is a random number between 0 and 1, and DT is the calculated download time.

Randomizing the time for performing downloads tends to evenly distribute the time during which downloads are performed, and thereby avoids crowding of the download execution, which would possibly overload computing, and/or communication resources.

Exemplary Method for Determining the Time for Performing a Download in Accordance with a User Specified Time Interval and a Set of User Specified System Resource Availability Weighting Factors.

Figure 6:
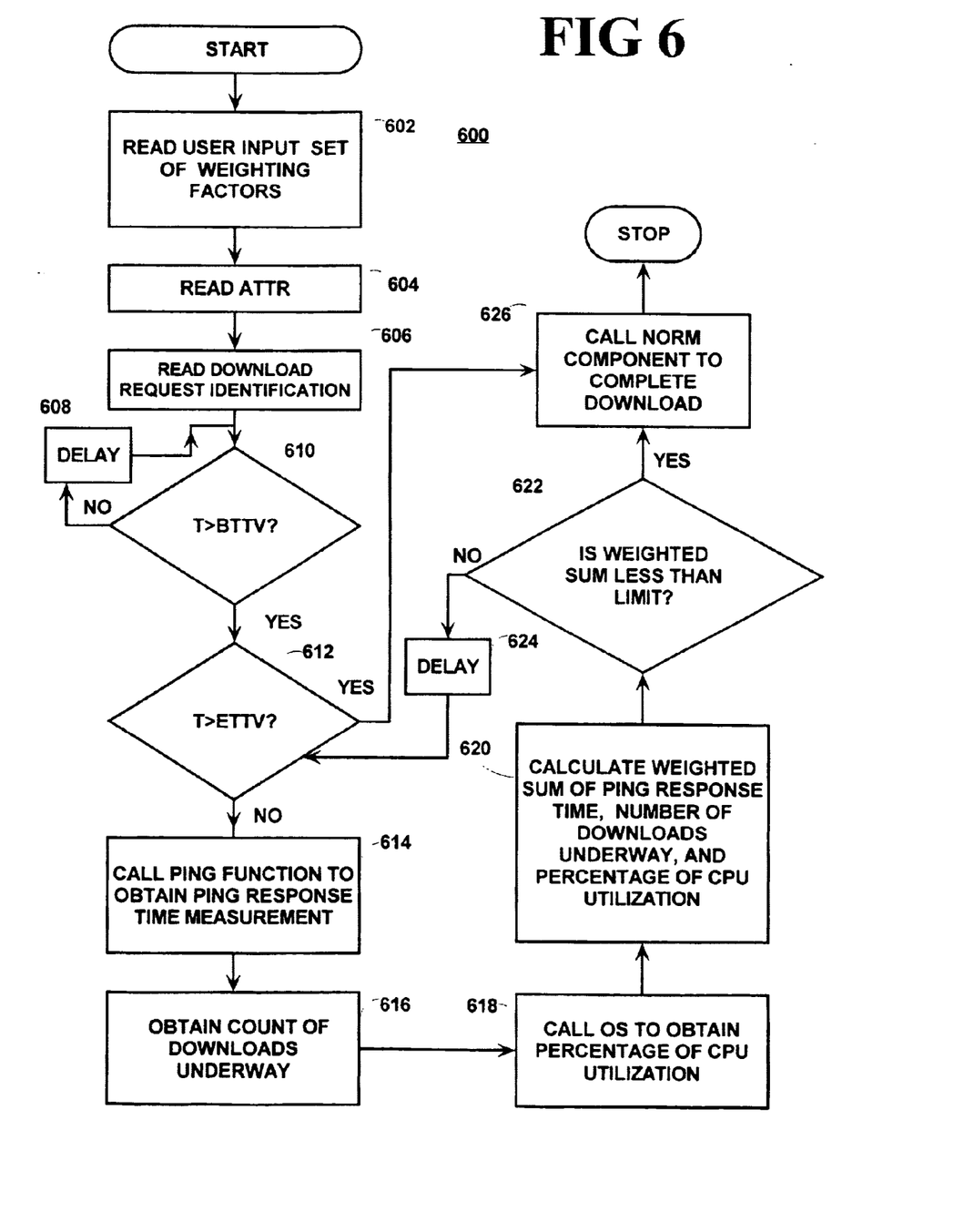
FIG. 6 is a flow diagram of a method for determining the time for performing a download in accordance with a user specified time interval, and user specified system resource availability weighting factors according to an embodiment of the present invention.

Referring to FIG. 6 a flow diagram of a method for determining a time for performing a download in accordance with a user specified time interval, and a set of user specified weighting factors which determine the weight to be given a plurality of measures of computing and communication resources is shown.

In process block 602 a set of weighting factors input by a user requesting the download is read. In process block 604 an ATTR comprising a Beginning Threshold Time Value (BTTV) and Ending Threshold Time Value (ETTV) input by the user are read. Alternatively the weighting factors and/or ATTR may constitute configuration settings that are stored in a configuration file for the download scheduling intelligent agent.

In process block 606, an identification of the file to be downloaded is read, e.g., received from the SNM module.

In process block 610, the current time, T is compared to the BTTV. If it is less, the process loops back to process block 610, after a delay 608. The length of the delay 608 is desirably chosen to be small compared to typical (e.g., average) ATTR lengths used in the system. If the current time T is greater than BTTV, then in process block 612 the current time T is compared to ETTV. If the current time exceeds ETTV then in process block 626 the NORM component is called to complete the download. The latter situation may occur if the user or administrator, has purposely set BTTV and ETTV so close, as to precisely determine the download time, or it may occur if time passes from BTTV to ETTV without system resources becoming sufficiently available to trigger the download scheduling intelligent agent to perform the download. If in process block 612 it is found that T is less ETTV, then in process block 614, a ping function is called to check the ping response time of the server from which the document is to be downloaded. The ping response time is indicative of the availability of server resources, and communication resources between the client and the server. In the case of an intranet bound client accessing the Internet through a proxy server/firewall, the ping time will be affected by the traffic load on the server firewall which may in fact act as a bottle neck and account for a large portion of the total ping time. In the case of the intranet bound clients connecting with Internet based server through a proxy server firewall, ping response times typically range from one milli-second to several seconds.

In process block 616 a count is obtained of the number of downloads currently underway. All instances of the download scheduling intelligent agent may contribute to maintaining a data structure (e.g., an integer variable stored in a memory means associated with the client computer 102) from which the count of downloads currently underway can be construed.

In process block 618, an operating system (OS) function is called to ascertain the percentage of CPU utilization.

In process block 620 a weighted sum of the ping response time, number of downloads currently underway, and the percentage of CPU utilization is calculated. The weighted sum may be expressed as:

$$WS=PRT*PRTW+DC*DCW+CPU\ CPUW$$

where,
PRT is the ping response time,
PRTW is the ping response time weight,
DC is a count of downloads currently taking place,
DCW is a weight for the count of the downloads currently taking place,
CPU is the percentage of CPU utilization,
CPUW is a weight for the percentage of CPU utilization, and
WS is the weighted sum value.

Given the different orders of magnitude of the variables involved in the weighted sum, PRT typically being measured in milliseconds, DC being on the order of 1, and CPU being on the order of 10, the corresponding weighting factors will typically be set at values of different orders of magnitude in order that each term will typically make a contribution of the same, or within one, order of magnitude to the weighted sum value WS. For example, to achieve the latter objective, the following values of weights could be chosen: PRTW=100, DCW=1, and CPUW=1/10. The differences in the scale appropriate for the each measure can be hidden from the user by presenting the user with identical choices for each weight, e.g., values of 1 to 10, and then resealing the input weights appropriately. Note that an increasing weighted sum WS is indicative of increasing utilization of computer and communication resources.

In process block 622, the weighted sum WS is compared to a limit value. The limit value can be chosen corresponding to a low level of combined computer, and communication resources.

If the weighted sum WS is not found to be less than the limit value, then after a delay 624, the process loops back to process block 612. The length of the delay 624 may be set to be some fraction of typical length of the ATTR period, or could, for example, alternatively be calculated from the actual value of ATTR chosen by the user by dividing it by sum number. The value of the delay 624 is preferably chosen to be at least on the order of the scale of time over which changes in the weighted sum occur in the typical computing environment, e.g., 15 seconds to 5 minutes.

If in process block 622 it is determined that the weighted sum is less than the limit value then in process block 624 the NORM component is called to complete the download.
Exemplary Method for Determining the Time for Performing a Download in Accordance with a Specified Time Interval and Set of Limit Values Indicative of Levels of Computer and Communication Resource Utilization Referring to FIG. 7, a flow diagram of a method for determining the time for performing a download in accordance with a specified time interval and a set of limit values indicative of levels of computer and communication resource utilization is shown.

Whereas the process illustrated with reference to FIG. 6 obtains a fuzzy measure in the form of a weighted sum of computing and communication resource availability, the process illustrated with reference to FIG. 7 checks each measure of computing and communication resource availability separately. Each must be within a limit in order for the download to take place, unless the ATTR period has been passed in which case the download will take place regardless of the values of the measures.

In process block 702 the current time is compared to BTTV. If the current time is less than the BTTV, then the process loops back to the process block 702 after a delay 704. The delay period 704 may be set to a value that is small compared to typical values of ATTR, or it may be derived from the ATTR period by dividing it by some divisor. If in process block 702 it is found that the current time does exceed BTTV, then the process continues with process block 704. In process block 704, it is determined if the current time exceeds ETTV. If it does then the in process block 724, the NORM component is called to complete the download. If the user sets BTTV=ETTV, in order to exactly determine the download time, then as soon as the criterion in process block 702 is met, the criterion in process block 706 will be met, and the download will be initiated. If in process block 706 it is determined that the current time does not exceed ETTV then the process proceeds to compare computing and communication resource utilization levels to limit values. The limit values could optionally be established in configuring the software which embodies the process shown in FIG. 7, or the limit values could be obtained through a dialogue box generated by the SNM, at the time that the user instantiates the download scheduling intelligent agent, e.g., by clicking on a web page containing embed tags which reference a plug-in which embodies the download scheduling intelligent agent.

In process block 708, the percentage of CPU utilization is obtained, e.g., by calling an operating function. In process block 710, the percentage of CPU utilization is compared to a CPU utilization limit value. Preferably the CPU utilization limit value will be set from 20% to 80%. If the CPU utilization is above the limit value then the process loops back to process block 706 after a delay 712. The loop consisting of process blocks 706, 708, 710, and 712, will continue to be executed until either ETTV is passed or the CPU utilization drops below the threshold value.

If in process block 710 it is determined that the current CPU utilization is below limit value, then in process block 714, a count of the downloads to the client computer 102 currently in progress is obtained. This count may, preferably, be obtained from a data structure maintained, as described in connection with process block 616 of FIG. 6. In process block 716 the count of the number of downloads obtained in process block 714 is compared to a to a limit. If the count exceeds the limit, then the process loops to process block 706 after a delay. The delay provides a time for computing and communication resources to be freed up before the CPU utilization, and the count of the downloads are again checked.

If in process block 716, it is determined that the count of the downloads currently taking place is less than the prescribed limit, then in process block 718 a ping response time is obtained from the server from which the download is to be performed. In process block 720, the ping response time (ping_time) between the client computer 102 and the server computer 114 is checked against a limit value. If the ping response time exceeds the limit value, then the process loops back to process block 706 through a delay 722. If the ping time does not exceed the limit value, then in process block 724 the NORM component is called to perform the download.

Figure 7:
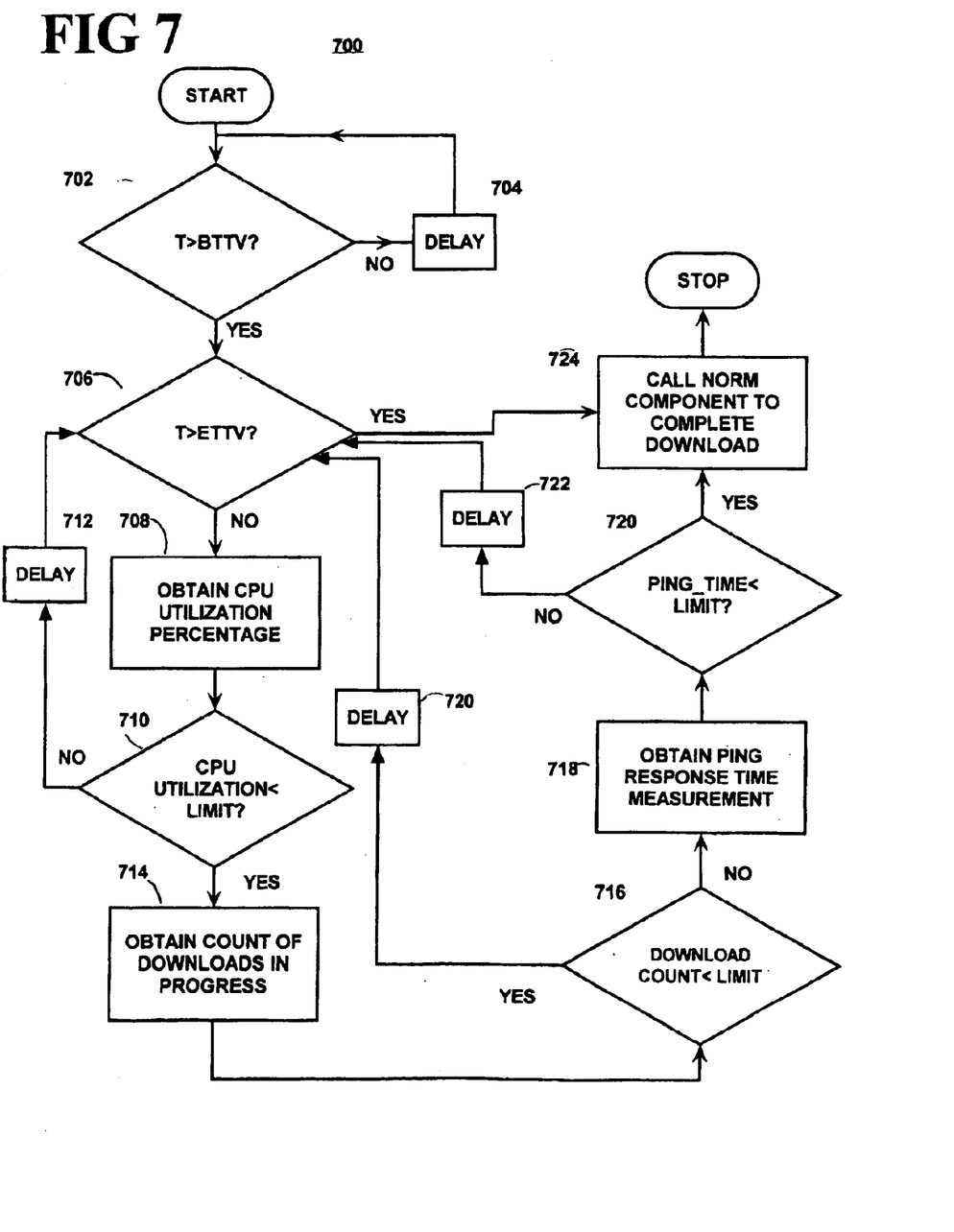
FIG. 7 is a flow diagram of an method for determining the time for performing a download in accordance with a specified time interval and set of limit values indicative of levels of computer and communication resource utilization according to an embodiment of the present invention.

Thus according to the process shown in FIG. 7, each measure of computer or communication resource availability must separately fall within its respective limit value.

The embodiments described above in connection with the FIGS utilize three preferred quantitative measure of computing and communication resource availability. Other quantitative measures could be substituted. According to the embodiment shown in FIG. 6 a fuzzy measure of resource availability in the form of a weighted sum is utilized, whereas in FIG. 7 each measure is separately compared to a limit. A hybrid approach could also be utilized in which weighted sums of subgroups of one or more measures of resource availability are compared to limit values. Preferably, each subgroup weighted sum would need to pass a limit value test in order for the download to be performed. For example the a weighted sum of the CPU percentage of utilization and the number of downloads currently underway would need to fall within a limit value, and a ping response time would also need to fall within a limit value.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

What is claimed is:

1. A method for scheduling a download from a server computer to a client computer, the method on the client computer comprising:

obtaining a first threshold time value;

obtaining a second threshold time value;

pinging at least one server to calculate locally at the client computer a response time between the client computer and the server;

obtaining a percentage of CPU utilization of the client;

calculating a weighted sum of the response time and the CPU utilization, where the weighted sum rescales at least one of the response time and the CPU utilization to provide a sum of at least two quantities with a given numeric order of magnitude; and determining locally at the client computer a time for performing a download between the first threshold time value and the second threshold time value based on the weighted result.

2. A method according to claim 1, wherein the determining a time comprises a sub-step of:

generating locally at the client computer a random time between the first threshold time value and the second threshold time value.

3. A method according to claim 2, wherein the generating locally at the client computer a random time further comprises:

selecting a random time between the first threshold time value and the second threshold time value, based on the random number, the first threshold time value and the second threshold time value.

4. A method according to claim 1, wherein the determining a time further comprises:

obtaining one or measures of local resource availability at the client computer including a count of the number of other downloads underway; and comparing the one or more measures to one or more corresponding preselected limits.

5. A method according to claim 4, wherein the calculating a weighted result of the response time and the CPU utilization-comprises:

calculating a weighted result of the response time and the CPU utilization and one or more measures of local resource availability.

6. A method according to claim 4, wherein the calculating a weighted result comprises:

calculating a weighted result using the equation of $$WS = PRT*PRTW + DC*DCW + CPU*CPUW$$

wherein,

PRTW is the response time weight for pinging the server,

DC is the count of number of downloads underway,

DCW is a weight for the count of number of downloads underway,

CPU is the percentage of CPU utilization,

CPUW is a weight for the percentage of CPU utilization, and

WS is the weighted result.

7. A method according to claim 6, wherein the response time weight of PRTW is on an order of magnitude of 100.

8. A method according to claim 6, wherein the weight of CPU utilization CPUW is on an order of magnitude of 1/10.

9. A method for scheduling a download from a server computer to a client computer, the method on the client computer comprising:

checking a percentage of CPU utilization of a client computer;

checking a ping response time between the client computer and a server computer;

obtaining a count at the client computer of a number of downloads currently underway;

obtaining a weight corresponding to the percentage of CPU utilization;

obtaining a weight corresponding to the ping response time;

obtaining a weight corresponding to the count of the number of downloads currently underway;

calculating a weighted sum of the percentage of CPU utilization, the ping response time, and the count of the number of downloads currently underway, using the weight corresponding to the percentage of CPU utilization, the weight corresponding to the ping response time, and the weight corresponding to the count of the number of downloads currently underway, where the weighted sum rescales at least one of the response time and the CPU utilization and the ping response time to provide a sum of at least two quantities with a given numeric order of magnitude; and comparing the weighted sum to a limit value.

10. A computer readable medium containing programming instructions for scheduling a download from a server computer to a client computer the programming instructions for execution on the client computer comprising:

obtaining a first threshold time value;

obtaining a second threshold time value;

pinging at least one server to calculate locally at the client computer a response time between the client computer and the server;

obtaining a percentage of CPU utilization of the client;

calculating a weighted result of the response time and the CPU utilization calculating a weighted sum of the response time and the CPU utilization, where the weighted sum rescales at least one of the response time and the CPU utilization to provide a sum of at least two quantities with a given numeric order of magnitude; and determining locally at the client computer a time for performing a download between the first threshold time value and the second threshold time value based on the weighted result.

11. A computer readable medium according to claim 10, wherein the programming instructions for determining a time further includes programming instructions for:

generating locally at the client computer a random time between the first threshold time value and the second threshold time value.

12. A computer readable medium according to claim 11, wherein the programming instructions for generating locally at the client computer a random time further includes programming instructions for:

selecting a random time between the first threshold time value and the second threshold time value, based on the random number, the first threshold time value and the second threshold time value.

13. A computer readable medium according to claim 12, wherein the programming instructions for determining the time further includes programming instructions for:

obtaining one or measures of local resource availability at the client computer including a count of the number of other downloads underway; and comparing the one or more measures to one or more corresponding preselected limits.

14. A method according to claim 13 wherein said programming instructions for calculating of a weighted result of the response time and the CPU utilization further includes programming instructions for:

calculating a weighted result of the response time and the CPU utilization and one or more measures of local resource availability.

15. A computer readable medium according to claim 13, wherein the programming instructions for calculating a weighted result further includes programming instructions for:

calculating a weighted result using the equation of $$WS=PRT*PRTW+DC*DCW+CPU*CPUW$$

wherein,

PRTW is the response time weight for pinging the server,

DC is the count of number of downloads underway,

DCW is a weight for the count of number of downloads underway,

CPU is the percentage of CPU utilization,

CPUW is a weight for the percentage of CPU utilization, and

WS is the weighted result.

16. A computer readable medium according to claim 15, wherein the response time weight of PRTW is on an order of magnitude of 100.

17. A computer readable medium according to claim 10, wherein the weight of CPU utilization CPUW is on an order of magnitude of 1/10.

18. A computer readable medium comprising programming instructions for scheduling a download from a server computer to a client computer including programming instructions for execution on the client computer for:

checking a percentage of CPU utilization;

checking a ping response time between the client computer and the server;

obtaining a count of a number of downloads currently underway;

checking a percentage of CPU utilization of a client computer;

checking a ping response time between the client computer and a server computer; and obtaining a count at the client computer of a number of downloads currently underway;

obtaining a weight corresponding to the percentage of CPU utilization;

obtaining a weight corresponding to the ping response time;

obtaining a weight corresponding to the count of the number of downloads currently underway;

calculating a weighted sum of the percentage of CPU utilization, the ping response time, and the count of the number of downloads currently underway, using the weight corresponding to the percentage of CPU utilization, the weight corresponding to the ping response time, and the weight corresponding to the count of the number of downloads currently underway; and comparing the weighted sum to a limit value.

19. A client information processing system comprising:

a network interface;

a client download scheduling intelligent agent for accepting specification from a user of a period during which a download is to be performed, and determining a time within the period for performing the download by pinging at least one server to calculate locally at a client computer a response time between the client computer and the server;

obtaining a percentage of CPU utilization of the client;

calculating a weighted result of the response time and the CPU utilization calculating a weighted sum of the response time and the CPU utilization, where the weighted sum rescales at least one of the response time and the CPU utilization to provide a sum of at least two quantities with a given numeric order of magnitude; and determining locally at the client computer, a time for performing a download between the time period which the download is to be performed and the second threshold time value based on the weighted result.

* * * * *